US008076789B2

(12) United States Patent
Miller

(10) Patent No.: US 8,076,789 B2
(45) Date of Patent: Dec. 13, 2011

(54) SYSTEM AND METHOD FOR CONTROLLING WIND TURBINE POWER OUTPUT

(75) Inventor: Nicholas Wright Miller, Delmar, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 12/974,525

(22) Filed: Dec. 21, 2010

(65) Prior Publication Data
US 2011/0204635 A1 Aug. 25, 2011

(51) Int. Cl.
*F03D 9/00* (2006.01)
*H02P 9/04* (2006.01)

(52) U.S. Cl. ............... 290/44; 290/43; 290/54; 290/55; 700/289

(58) Field of Classification Search .............. 290/43, 290/44, 54; 700/289
See application file for complete search history.

(56) References Cited

U.S. PATENT DOCUMENTS

| 4,494,008 | A | 1/1985 | Patton | 290/44 |
|---|---|---|---|---|
| 5,155,375 | A | 10/1992 | Holley | 290/44 |
| 5,289,041 | A | 2/1994 | Holley | 290/44 |
| 6,858,953 | B2 | 2/2005 | Stahlkopf | 290/44 |
| 7,002,260 | B2 | 2/2006 | Stahlkopf | 290/44 |
| 7,356,383 | B2 * | 4/2008 | Pechtl et al. | 700/288 |
| 7,420,289 | B2 * | 9/2008 | Wang et al. | 290/44 |
| 7,430,534 | B2 * | 9/2008 | Lof et al. | 705/37 |
| 7,432,611 | B2 | 10/2008 | Stahlkopf | 290/44 |
| 7,505,833 | B2 * | 3/2009 | Delmerico et al. | 700/291 |
| 7,622,816 | B2 | 11/2009 | Stahlkopf | 290/44 |
| 7,797,082 | B2 * | 9/2010 | Srinivasan et al. | 700/289 |
| 2002/0194113 | A1 * | 12/2002 | Lof et al. | 705/37 |
| 2004/0207207 | A1 * | 10/2004 | Stahlkopf | 290/44 |
| 2005/0062290 | A1 * | 3/2005 | Stahlkopf | 290/44 |
| 2006/0087124 | A1 * | 4/2006 | Stahlkopf | 290/44 |
| 2006/0178782 | A1 * | 8/2006 | Pechtl et al. | 700/286 |
| 2007/0228838 | A1 * | 10/2007 | Delmerico et al. | 307/84 |
| 2008/0140263 | A1 * | 6/2008 | Wang et al. | 700/291 |
| 2008/0307853 | A1 * | 12/2008 | Siebers et al. | 73/1.29 |
| 2009/0027002 | A1 * | 1/2009 | Stahlkopf | 320/101 |
| 2009/0177333 | A1 * | 7/2009 | Delmerico et al. | 700/297 |
| 2010/0133817 | A1 * | 6/2010 | Kinzie et al. | 290/44 |
| 2011/0006527 | A1 * | 1/2011 | Kinzie et al. | 290/44 |

\* cited by examiner

*Primary Examiner* — Pedro J Cuevas
(74) *Attorney, Agent, or Firm* — James McGinness, Esq.; Armstrong Teasdale LLP

(57) ABSTRACT

A system and method for use in controlling a wind turbine's power output by a wind turbine controller. The method includes determining a predicted wind speed for the wind turbine, determining a current wind turbine power output, and determining a predicted wind turbine power output utilizing the predicted wind speed. The method also includes comparing the current wind turbine power output to the predicted wind turbine power output and adjusting the wind turbine power output based on the comparison of the current wind turbine power output and the predicted wind turbine power output.

20 Claims, 7 Drawing Sheets

SYSTEM AND METHOD FOR CONTROLLING WIND TURBINE POWER OUTPUT

BACKGROUND OF THE INVENTION

The subject matter described herein relates generally to operating wind turbines and, more particularly, to adjusting the power output of one or more wind turbines to provide a relatively more uniform output thereby improving the system frequency and other system control objectives such as scheduled power interchange.

Electricity generated from wind power can be highly variable due to the variations in wind speed and direction. This variation may cause rapid increases or drops in energy output delivered by wind turbines and wind plants to the power grid, which in turn, may have an adverse effect on the power grid. Because of the adverse effects on the power grid, various adverse cost impacts may occur, including that a wind farm operator may be required to pay a monetary penalty for providing more or less power than is typically produced, that the grid operator may need to run more expensive reserve generation or may incur fines for violating scheduled power interchange with neighboring systems. There is a need for wind power generation system that maintains a relatively more steady power output when connected to the power grid.

BRIEF DESCRIPTION OF THE INVENTION

In one aspect, a system for use in controlling a wind turbine's power output by a wind turbine controller is provided. The method includes determining a predicted wind speed for the wind turbine, determining a current wind turbine power output, and determining a predicted wind turbine power output utilizing the predicted wind speed. The method also includes comparing the current wind turbine power output to the predicted wind turbine power output and adjusting the wind turbine power output based on the comparison of the current wind turbine power output and the predicted wind turbine power output.

In another aspect, a system for use in operating a plurality of wind turbines controlling a wind turbine's power output is provided. The system includes a plurality of wind turbine controllers, each wind turbine controller of the plurality of wind turbine controllers operatively coupled to a wind turbine of a plurality of wind turbines, and a site controller coupled in communication with the plurality of wind turbine controllers and configured to determine a predicted wind speed for the wind turbine, determine a current wind turbine power output, and determine a predicted wind turbine power output utilizing the predicted wind speed. The site controller is also configured to compare the current wind turbine power output to the predicted wind turbine power output, and adjust the wind turbine power output based on the comparison of the current wind turbine power output and the predicted wind turbine power output.

In another aspect, a device for use in controlling a wind turbine's power output is provided. The device includes a memory device configured to store a target power output range, a processor coupled to the memory device and programmed to: determine a predicted wind speed for the wind turbine, determine a current wind turbine power output, determine a predicted wind turbine power output utilizing the predicted wind speed, and compare the current wind turbine power output to the predicted wind turbine power output, and a communication interface coupled to the processor and configured to adjust the wind turbine power output based on the comparison of the current wind turbine power output and the predicted wind turbine power output of at least a first wind turbine controller of the plurality of wind turbine controllers.

In yet another aspect, one or more computer readable storage media having computer-executable instructions embodied thereon are provided. The one or more computer readable storage media include computer-executable instructions embodied thereon, wherein when executed by at least one processor, the computer-executable instructions cause the processor to determine a predicted wind speed for a wind turbine, determine a current wind turbine power output, and determine a predicted wind turbine power output utilizing the predicted wind speed. The one or more computer readable storage media also include computer-executable instructions that cause the processor to compare the current wind turbine power output to the predicted wind turbine power output, and adjust the wind turbine power output based on the comparison of the current wind turbine power output and the predicted wind turbine power output.

DETAILED DESCRIPTION OF THE INVENTION

The embodiments described herein facilitate operating one or more wind turbines in a site by maintaining a relatively steady power output in response to meteorological conditions. Power output may be determined by direct measurement and/or by calculating wind speeds based on wind turbine characteristics (e.g., wind turbine dimensions, blade geometry, and/or blade surface roughness) and/or operating conditions (e.g., wind speed and/or wind direction). When a power output level deviates from a target power output level, an operational adjustment may be transmitted to one or more wind turbine controllers that are coupled to the wind turbines.

A target power output level may include, without limitation, a power output level defined by a regulation (e.g., enacted by a municipality or other government body), by a command issued by the power system operator, by a contractual or property-based obligation, or by a preference of an operator of a wind turbine site.

In some embodiments, in response to a predicted wind speed that would correspond to a predicted power output level below the target power output level, an operational adjustment is calculated to gradually decrease the power output to avoid severe power output changes. In other embodiments, in response to a predicted wind speed that would correspond to a predicted power output level at or above the target power output level, an operational adjustment is calculated to permit a gradual increase of the power output to avoid an unacceptably rapid increase in power output. In other embodiments, in response to a predicted wind speed that would correspond to a predicted power output level that would correspond to a rate-of-change at or above the target power output threshold, an operational adjustment is calculated to permit a gradual change of the power output to avoid an unacceptably rapid change in the rate-of-change of the power output.

Embodiments are described herein with reference to geographic positions. As used herein the term "geographic position" refers to a point in a two-dimensional or three-dimensional space. For example, a geographic position may be expressed in two dimensions as a latitude and a longitude, or in three dimensions as a latitude, a longitude, and an elevation.

Figure 1:
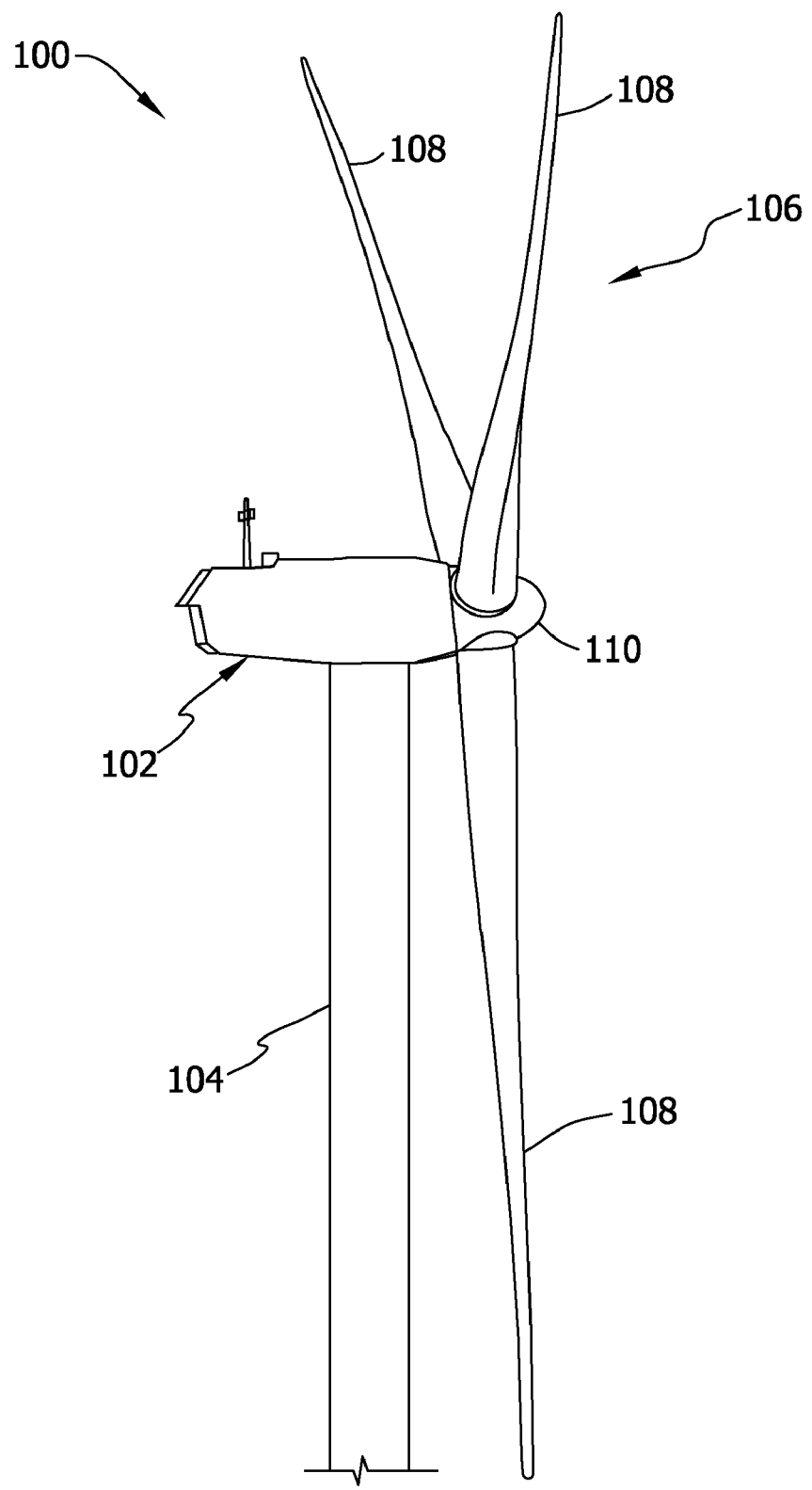
FIG. 1 is a perspective view of an exemplary wind turbine.

FIG. 1 is a perspective view of an exemplary wind turbine 100. Wind turbine 100 includes a nacelle 102 that houses a generator (not shown in FIG. 1). Nacelle 102 is mounted on a tower 104 (only a portion of tower 104 is shown in FIG. 1). Tower 104 may have any suitable height that facilitates operation of wind turbine 100 as described herein. In an exemplary embodiment, wind turbine 100 also includes a rotor 106 that includes three rotor blades 108 coupled to a rotating hub 110. Alternatively, wind turbine 100 may include any number of rotor blades 108 that enable operation of wind turbine 100 as described herein. In an exemplary embodiment, wind turbine 100 includes a gearbox (not shown) that is rotatably coupled to rotor 106 and to the generator, and an energy storage device (not shown) including, but not limited to, a capacitor, a battery, a flywheel, and rotor 106. In one embodiment, the energy storage device is configured to allow access to an inherent inertia of the wind turbine 100 using a device such as, but not limited to, a flywheel, and rotor 106.

Figure 2:
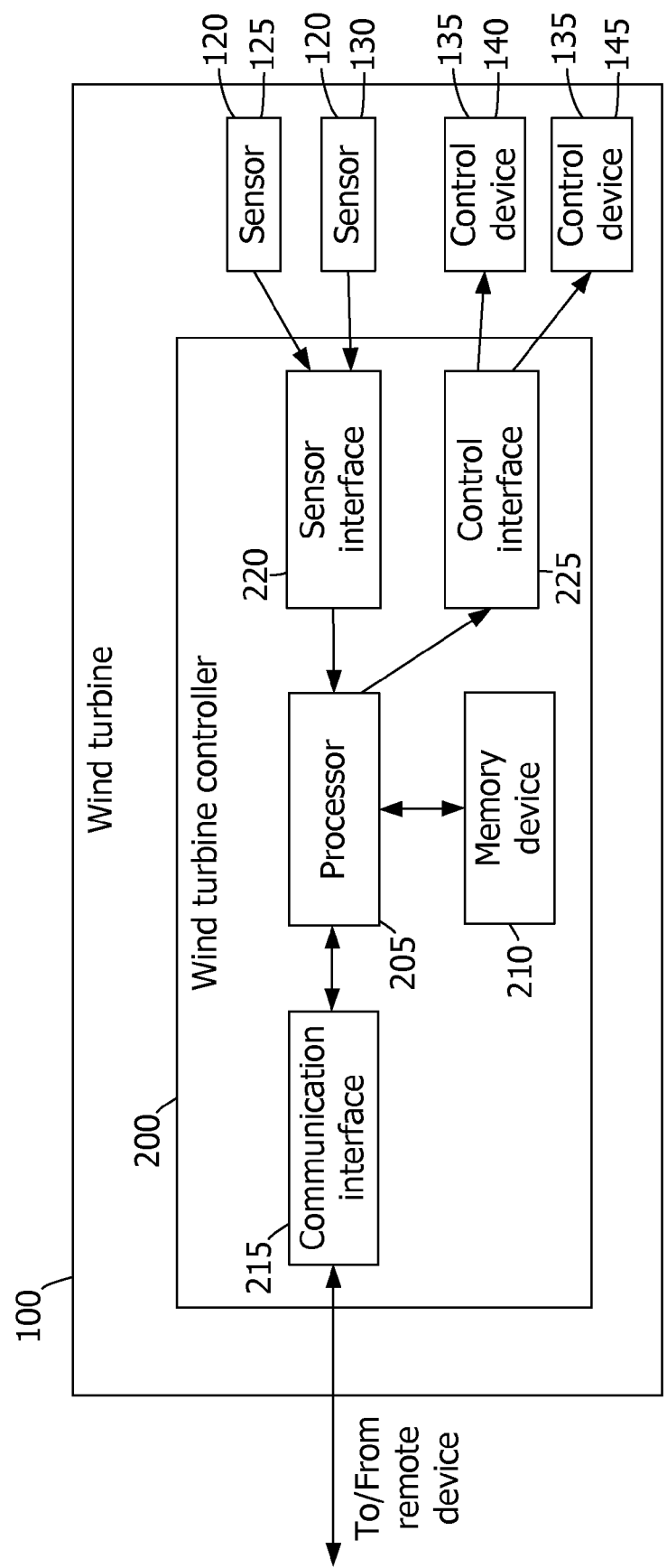
FIG. 2 is a block diagram illustrating an exemplary wind turbine controller for use with the wind turbine shown in FIG. 1.

In some embodiments, wind turbine 100 includes one or more sensors 120 and/or control devices 135 (shown in FIG. 2). Sensors 120 sense or detect wind turbine operating conditions. For example, sensor(s) 120 may include a wind speed and/or a direction sensor (e.g., an anemometer), an ambient air temperature sensor, an air density sensor, an atmospheric pressure sensor, a humidity sensor, a power output sensor, a blade pitch sensor, a turbine speed sensor, a gear ratio sensor, and/or any sensor suitable for use with wind turbine 100. Each sensor 120 is located according to its function. For example, an anemometer may be positioned on an outside surface of nacelle 102, such that the anemometer is exposed to air surrounding wind turbine 100. Each sensor 120 generates and transmits one or more signals corresponding to a detected operating condition. For example, an anemometer transmits a signal indicating a wind speed and/or a wind direction. In the exemplary embodiment, sensor 120 is a light detection and ranging (LIDAR) system sensor and is configured to predict wind speeds. Moreover, each sensor 120 may transmit a signal continuously, periodically, or only once, for example, though other signal timings are also contemplated. Furthermore, each sensor 120 may transmit a signal either in an analog form or in a digital form. In one embodiment, a forecast for meteorological data is utilized in place of sensor 120.

Control devices 135 are configured to control an operation of wind turbine 100 and may include, without limitation, a brake, a relay, a motor, a solenoid, and/or a servomechanism. A control device 135 may adjust a physical configuration of wind turbine 100, such as an angle or pitch of rotor blades 108 and/or an orientation of nacelle 102 or rotor 106 with respect to tower 104.

FIG. 2 is a block diagram illustrating an exemplary wind turbine controller 200 for use with wind turbine 100. Wind turbine controller 200 includes a processor 205 for executing instructions and a memory device 210 configured to store data, such as computer-executable instructions and operating parameters. Wind turbine controller 200 also includes a communication interface 215. Communication interface 215 is configured to be coupled in signal communication with one or more remote devices, such as another wind turbine controller 200 and/or a computing device (shown in FIG. 3).

In some embodiments, wind turbine controller 200 includes one or more sensor interfaces 220. Sensor interface 220 is configured to be communicatively coupled to one or more sensors 120, such as a first sensor 125 and a second sensor 130, and may be configured to receive one or more signals from each sensor 120. Sensor interface 220 facilitates monitoring and/or operating wind turbine 100. For example, wind turbine controller 200 may monitor operating conditions (e.g., wind speed, wind direction, rotor speed, and/or power output) of wind turbine 100 based on signals provided by sensors 120. In one embodiment, the wind turbine controller 200 is configured to calculate a power output produced by the corresponding wind turbine 100 based on one or more wind turbine characteristics (e.g., wind turbine dimensions and/or a rotor blade geometry), one or more operating parameters (e.g., a wind speed, a wind direction, a rotor blade tip speed, or a rotor blade pitch angle), and/or an operational state (e.g., disabled, curtailed, or normal) of a wind turbine 100.

In an exemplary embodiment, processor 205 executes one or more monitoring software applications and/or control software applications. A software application may produce one or more operating parameters that indicate an operating condition, and memory device 210 may be configured to store the operating parameters. For example, a history of operating parameters may be stored in memory device 210.

In some embodiments, wind turbine controller 200 also includes a control interface 225, which is configured to be communicatively coupled to one or more control devices 135, such as a first control device 140 and a second control device 145. In one embodiment, wind turbine control interface 225 is configured to operate control device 135 including a brake to prevent rotor 106 (shown in FIG. 1) from rotating. In addition, or in the alternative, wind turbine control interface 225 may operate a control device 135 including a blade pitch servomechanism to adjust one or more rotor blades 108 (shown in FIG. 1) to a desired and/or predetermined pitch. In an alternative embodiment, electrical power and torque are operated by control device 135. The brake, the blade pitch servomechanism, and the electrical power may be operated by the same control device 135 or a first control device 135 and a second control device 135. In the exemplary embodiment, wind turbine controller 200 is configured to operate control devices 135 to achieve a desired power output.

Figure 3:
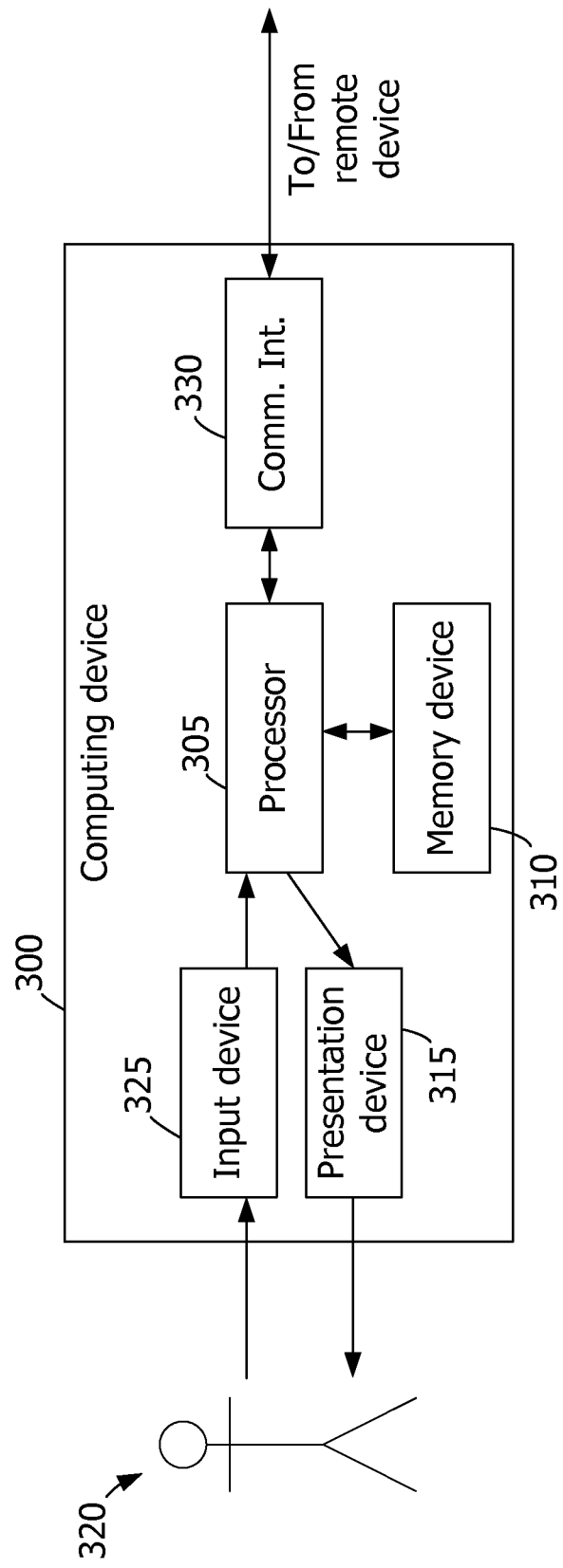
FIG. 3 is a block diagram illustrating an exemplary computing device.

FIG. 3 is a block diagram illustrating an exemplary computing device 300. Computing device 300 includes a processor 305 for executing instructions. In some embodiments, executable instructions are stored in a memory device 310. Memory device 310 is any device allowing information, such as executable instructions and/or other data, to be stored and retrieved.

In some embodiments, computing device 300 includes at least one presentation device 315 for presenting information to user 320. Presentation device 315 is any component capable of conveying information to user 320. Presentation device 315 may include, without limitation, a display device (e.g., a liquid crystal display (LCD), organic light emitting diode (OLED) display, or "electronic ink" display) and/or an audio output device (e.g., a speaker or headphones). In some embodiments, presentation device 315 includes an output adapter, such as a video adapter and/or an audio adapter. An output adapter is operatively coupled to processor 305 and configured to be operatively coupled to an output device, such as a display device or an audio output device.

In some embodiments, computing device 300 includes an input device 325 for receiving input from user 320. Input device 325 may include, for example, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both an output device of presentation device 315 and input device 325. Computing device 300 also includes a communication interface 330, which is configured to be communicatively coupled to one or more wind turbine controllers 200 and/or one or more other computing devices 300.

Stored in memory device 310 are, for example, computer readable instructions for determining and responding to power output levels, providing a user interface to user 320 via presentation device 315, and/or receiving and processing input (e.g., target power output levels) from input device 325. In addition, or alternatively, memory device 310 may be configured to store target power output levels, measured power output levels, calculated power output levels, and/or any other data suitable for use with the methods described herein.

Figure 4:
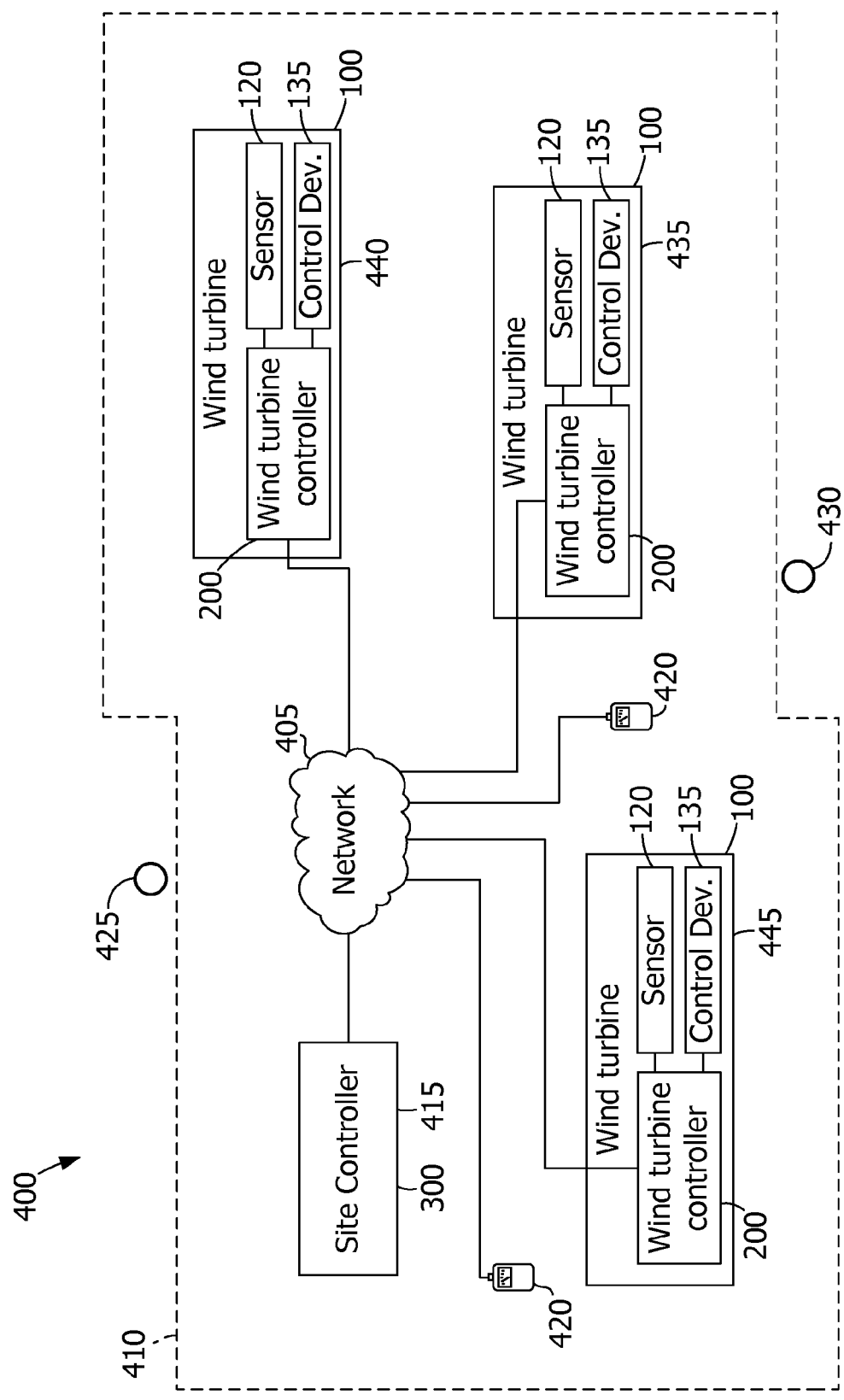
FIG. 4 is a block diagram illustrating an exemplary system for use in operating one or more wind turbines, such as the wind turbine shown in FIG. 1.

FIG. 4 is a block diagram illustrating an exemplary system 400 for use in operating one or more wind turbines 100. System 400 includes a network 405. For example, network 405 may include, without limitation, the Internet, a local area network (LAN), a wide area network (WAN), a wireless LAN (WLAN), a mesh network, and/or a virtual private network (VPN).

In an exemplary embodiment, a wind turbine site 410 includes a plurality of wind turbines 100, each of which includes a wind turbine controller 200. One or more computing devices 300 (shown in FIG. 3), such as a site controller 415, are configured to be coupled in signal communication with wind turbine controllers 200 via network 405.

In an exemplary embodiment, site controller 415 is positioned at wind turbine site 410. Alternatively, site controller 415 may be positioned outside wind turbine site 410. For example, site controller 415 may be communicatively coupled to wind turbine controllers 200 at a plurality of wind turbine sites 410.

Each of site controller 415 and wind turbine controller 200 includes a processor, (shown in FIGS. 2 and 3). A processor may include a processing unit, such as, without limitation, an integrated circuit (IC), an application specific integrated circuit (ASIC), a microcomputer, a programmable logic controller (PLC), and/or any other programmable circuit. A processor may include multiple processing units (e.g., in a multi-core configuration). Each of site controller 415 and wind turbine controller 200 is configurable to perform the operations described herein by programming the corresponding processor. For example, a processor may be programmed by encoding an operation as one or more executable instructions and providing the executable instructions to the processor in a memory device (also shown in FIGS. 2 and 3) that is coupled to the processor. A memory device may include, without limitation, one or more random access memory (RAM) devices, one or more storage devices, and/or one or more computer readable media.

In some embodiments, one or more wind speed sensors 420 are coupled in communication with site controller 415. Wind speed sensors 420 are configured to provide a predicted wind speed for indicating a wind speed corresponding to a geographic position. In one embodiment, sensors 120 of one or more wind turbines 100 include a wind speed sensor 420. Wind speed sensors 420 may be further configured to provide a direction associated with a predicted wind speed measurement. For example, a wind speed sensor 420 may provide wind level measurements associated with a plurality of directions at a single geographic position.

In an exemplary embodiment, system 400 enables operation of wind turbines 100 such that a relatively balanced system power output is maintained. System 400 may further enable operation of wind turbines 100 such that power output of site 410 is optimized within the bounds of the target power output levels.

Figure 5:
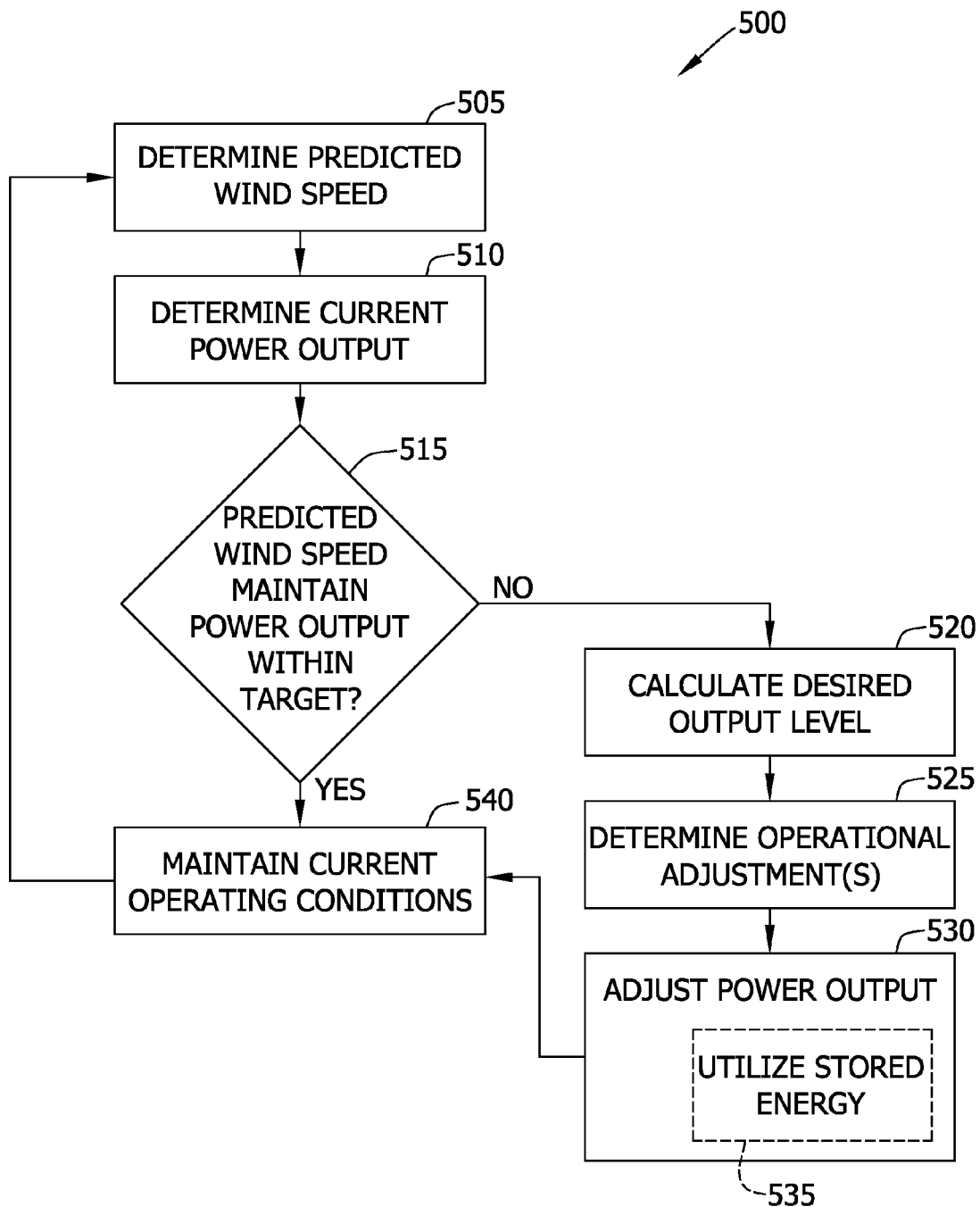
FIG. 5 is a flowchart of an exemplary method for use in operating one or more wind turbines using the system shown in FIG. 4.

FIG. 5 is a flowchart of an exemplary method 500 for use in operating one or more wind turbines 100 (shown in FIG. 1) using system 400 (shown in FIG. 4). All or a portion of method 500 may be performed by one or more computing devices 300 (shown in FIG. 3), such as, without limitation, wind turbine controller 200, and/or site controller 415 (shown in FIGS. 2 and 4). In the exemplary embodiment, site controller 415 determines 505 predicted wind speeds associated with wind turbines 100 using sensors 120 and/or wind speed sensors 420. The predicted wind speeds may be determined 505 in a time frame ranging from 1 second to 10 minutes in advance. In the exemplary embodiment, the predicted wind speeds are determined 505 at least one second in advance.

In the exemplary embodiment, the current power output of the wind turbine 100 is determined 510 by at least one of the wind turbine controller 200 and the site controller 415. In one embodiment, wind turbine controller 200 calculates a power output level for wind turbine 100 and transmits the calculated power output level to site controller 415. In an alternative embodiment, wind turbine controller 200 transmits the wind turbine characteristics, operating parameters, and/or operational state to site controller 415 and site controller 415 calculates the power output level produced by wind turbine 100.

Whether performed by wind turbine controller 200 or site controller 415, determining 510 a current power output level produced by a wind turbine 100 provides a current power output level associated with a corresponding geographic position at certain operating parameters.

In addition, or alternatively, wind speed sensors 420 may provide wind speed level measurements indicating a wind speed level associated with a geographic position and, optionally, with a plurality of directions. In some embodiments, wind speed sensor 420 is included as a sensor 120 of one or more wind turbines 100. Site controller 415 determines 510 a current power output at one or more geographic positions based on the calculated and/or measured wind speed. When measured wind speed is used, the current power output may also be determined 510.

In the exemplary embodiment, site controller 415 determines 515 if the predicted wind speed allows wind turbine 100 to produce power within a target power output range, using the determined 505 predicted wind speeds. In one embodiment, the target power output range is expressed as a specific power level in the range of zero to 100% of wind turbine rating, with deadband requirement which specifies the required accuracy in the range from zero to 100 percent of turbine rating. Alternatively, the target power output range can be any range that enables the disclosure to function as described herein. In an alternative embodiment, site controller 415 determines 515 if the predicted wind speed allow wind turbine 100 to produce a power output within a threshold value. The threshold value may be defined in absolute (e.g., 2 kW, 3 kW, or 5 kW) or relative (e.g., 3%, 5%, or 10%) terms.

In an alternative embodiment, site controller 415 determines 515 if the predicted wind speed will cause wind turbine 100 to produce a rate-of-change of power output outside of a threshold value. In one embodiment, the threshold value is may be defined in absolute (e.g., 2 MW/min, −2 MW/Min, −5 MW/min) or relative (e.g., +3%/min, −4%/min, −5%/10 minutes).

If the predicted wind speed will not allow wind turbine 100 to produce power within the target power output range or threshold value, site controller 415 calculates 520 a desired power output level for one or more wind turbines 100. The calculated 520 desired output level is a power output level that can be supported by the determined 505 predicted wind speeds.

Based on the calculated 520 desired power output level associated with wind turbine 100, site controller 415 determines 525 an operational adjustment. In one embodiment, determining 525 an operational adjustment includes transmitting the desired maximum power output level associated with a wind turbine 100 to a corresponding wind turbine controller 200. In such an embodiment, wind turbine controller 200 is configured to adjust operating parameters of wind turbine 100 to achieve the desired power output. In an alternate embodiment, site controller 415 is configured to determine one or more operating parameters (e.g., a rotor blade pitch angle, a maximum rotor blade speed, and/or a maximum torque) for wind turbine 100 and transmit to wind turbine controller 200 an operational adjustment that includes the determined operating parameters.

Operational adjustments may be determined 525 such that a difference between a predicted power output, corresponding to a predicted wind speed, and the target power output level decreases when the operational adjustment is applied. In one embodiment, when the predicted power output corresponding to a predicted wind speed will be below the target power output range or threshold value, an operational adjustment is determined 525 to reduce the power output to prevent a severe loss of power. In an alternative embodiment, when the predicted wind speed will cause wind turbine 100 to produce a predicted power output above the target power output range or threshold value, an operational adjustment may be determined 525 to reduce the power output to maintain the power output within the target power output range or threshold value. In yet another alternative embodiment, if the current power output is below the target power output range or threshold value and the predicted power output will produce a predicted power output within the target power output range or threshold value, an operational adjustment may be determined 525 to increase the power output.

In the exemplary embodiment, when a decision to decrease the power output of wind turbine 100 is determined 525, site controller 415 gradually reduces 530 the power output to the calculated 520 desired output level. In an alternative embodiment, if a decision to increase the power output is determined 525, site controller 415 gradually increases 530 the power output to the calculated 520 desired output level. In the exemplary embodiment, to prevent the power output levels from varying dramatically, if at any time during the gradual increase/decrease of power output the current wind cannot sustain the gradual increase/decrease of power output, site controller 415 utilizes 535 energy stored within the energy storage device (not shown). When the gradual adjustment 530 has finished, wind turbine 100 is maintained 540 in the current operating conditions.

Figure 6:
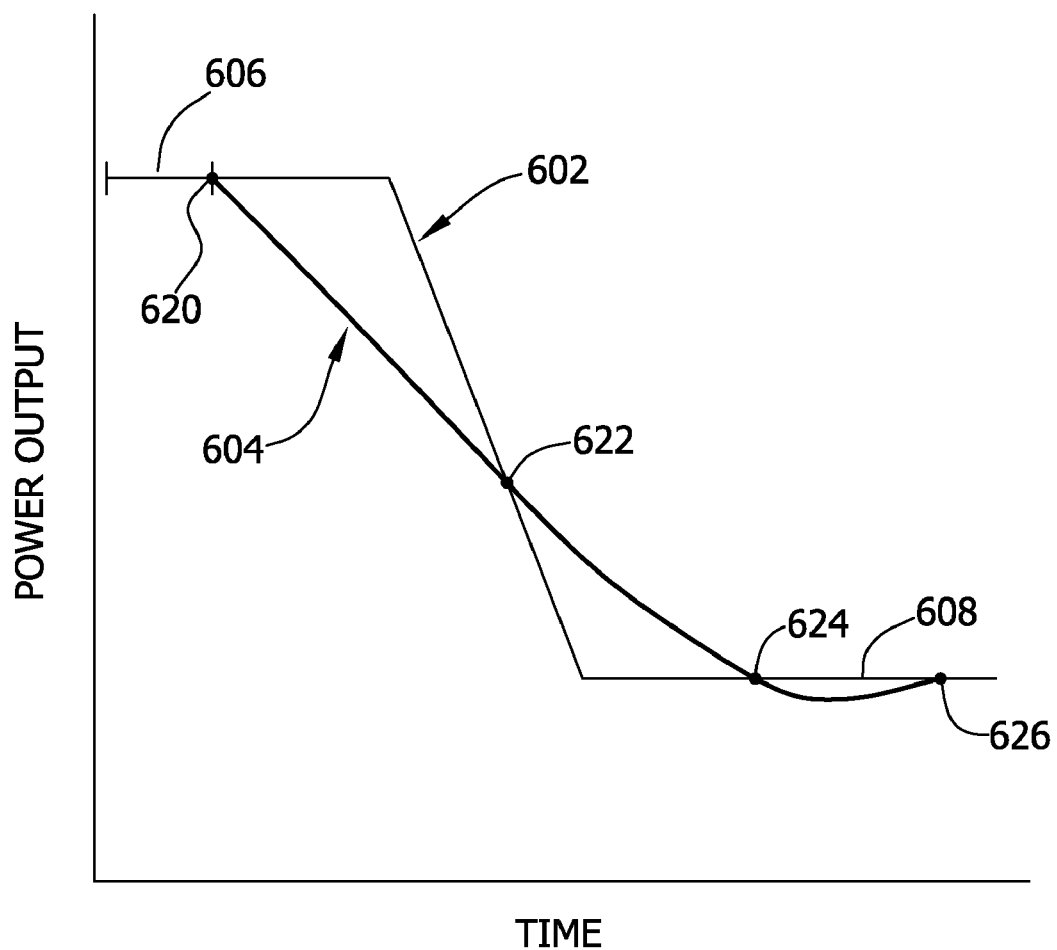
FIG. 6 is an exemplary graph showing the relationship between power output of wind turbine 100 versus time using the method shown in FIG. 5.
Figure 7:
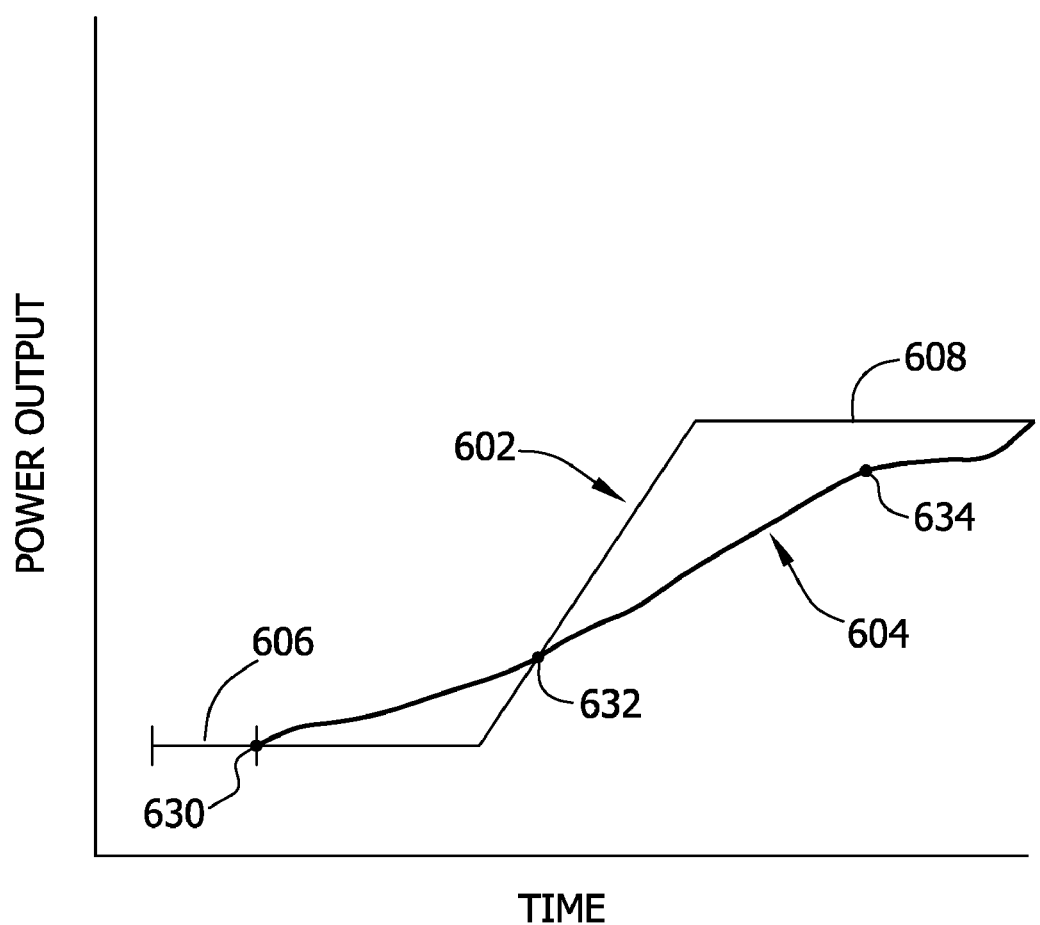
FIG. 7 is an exemplary graph showing the relationship between power output of wind turbine 100 versus time using the method shown in FIG. 5.

FIGS. 6 and 7 are exemplary graphs showing the relationship between power output of wind turbine 100 versus time using the method shown in FIG. 5. A solid line 602 represents the power output resulting from a change in wind speed. A dashed line 604 represents the power output gradually adjusting 530 as a result of implementing the determined 525 operational adjustments. Portion 606 of solid line 602 represents the determined 510 current power output and portion 608 of solid line 602 represents the calculated 520 desired output level of wind turbine 100.

In one embodiment, as shown in FIG. 6, if site controller 415 makes a determination 525 to reduce the power output in response to a low predicted power output, an operational adjustment to gradually decrease 530 the power output to the calculated 520 desired output level is initialized at point 620. The power output is gradually decreased 530 until the power output is below the calculated 520 desired output level, such as point 608. From point 622 to point 624, power output is above what can be produced from the current wind alone. When the power output arrives at the point 622, at which point the power output cannot be sustained by the current wind, site controller 415 utilizes energy stored in the energy storage device until the current wind can sustain the power output, such as point 624.

At point 624, the power output falls below the calculated 520 desired output level until point 626. From point 624 until point 626, wind turbine 100 returns an equal amount of energy used between points 622 to 624 to the energy storage device. At point 626, the power output is kept in line with the calculated 520 desired output level and wind turbine 100 is maintained 540 at the current operating conditions.

In an alternative embodiment, as shown in FIG. 7, if site controller 415 makes a determination 525 to increase the power output in response to a high predicted power output, an operational adjustment to gradually increase 530 the power output to the calculated 520 desired power output level is initialized at point 630. The power output is gradually increased 530 to the calculated 520 desired output level. From point 630 to point 632, power output is above what can be produced from the current wind alone. When the gradual increase 530 of power output is initialized at point 630, at which point the power output cannot be sustained by the current wind, site controller 415 utilizes energy stored in the energy storage device until the current wind can sustain the power output, such as point 632.

From point 632, the power output continues to gradually increase towards the calculated 520 desired output level. In one embodiment, when the power output is capable of maintaining the calculated 520 desired output level, at point 634, site controller 415 maintains the power output below the calculated 520 desired output level and returns power to the energy storage device until an equal amount of energy used between points 630 to 632 is returned to the energy storage device. The power output is then maintained 540 at the current operating conditions at the calculated 520 desired output level.

Method 500 may be performed repeatedly (e.g., continuously, periodically, or upon request), enabling continual adjustment to operation of wind turbines 100 in site 410. For example, as the wind direction changes, the power output level at second geographic position 430 may increase, while the power output level at first geographic position 425 decreases. Accordingly, operational adjustments may be determined 525 and transmitted to ensure the target power output range or threshold value at second geographic position 430 is not exceeded.

Similarly, if a wind turbine, such as first wind turbine 435, is disabled for maintenance or repair, or is operated at a reduced level of operation for any reason, the power output level decreases, and site controller 415 may automatically increase a desired maximum power output level associated with a second wind turbine 440 and a third wind turbine 445, such that the power output of second wind turbine 440 and third wind turbine 445 is increased. When first wind turbine 435 is activated again, power output produced by first wind turbine 435 is reflected in the aggregate power output level, and site controller 415 may adjust the desired maximum power output level of second wind turbine 440 and third wind turbine 445 downward to ensure compliance with the target power output ranges or threshold levels.

Embodiments provided herein facilitate automatically and continually adjusting the operation of wind turbines based on a power output level at one or more geographic positions that are associated with a target power output range or threshold value. Adjusting wind turbine operation as described herein enables an operator of a wind turbine site to provide a relatively constant power output, and/or a relatively lower rate-of-change of power output when faced with variable meteorological conditions.

The methods described herein may be encoded as executable instructions embodied in a computer readable storage medium including, without limitation, a memory device of a computing device. Such instructions, when executed by a processor, cause the processor to perform at least a portion of the methods described herein.

Exemplary embodiments of a wind turbine control system are described above in detail. The system, devices, wind turbine, and included assemblies are not limited to the specific embodiments described herein, but rather each component may be utilized independently and separately from other components described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for use in controlling a wind turbine's power output by a wind turbine controller, the method comprising:
   determining a predicted wind speed for the wind turbine;
   determining a current wind turbine power output;
   determining a predicted wind turbine power output utilizing the predicted wind speed;
   comparing the current wind turbine power output to the predicted wind turbine power output; and,
   adjusting the wind turbine power output based on the comparison of the current wind turbine power output and the predicted wind turbine power output.

2. A method in accordance with claim 1, further comprising defining a target power output range.

3. A method in accordance with claim 2, wherein comparing the current wind turbine power output to the predicted wind turbine power output comprises determining if the predicted wind turbine power output is outside the defined target power output range.

4. A method in accordance with claim 3, further comprising calculating a desired power output if the predicted power output is outside the defined target power output range.

5. A method in accordance with claim 4, further comprising determining an operational adjustment in response to the calculated desired power output.

6. A method in accordance with claim 1, wherein adjusting the wind turbine power output comprises utilizing energy stored within a wind turbine energy storage device.

7. A method in accordance with claim 1, wherein adjusting the wind turbine power output comprises transmitting energy to the energy storage device.

8. A system for use in controlling a wind turbine's power output, the system comprising:
   a plurality of wind turbine controllers, each wind turbine controller of the plurality of wind turbine controllers operatively coupled to a respective wind turbine of a plurality of wind turbines; and
   a site controller coupled in communication with the plurality of wind turbine controllers and configured to:
      determine a predicted wind speed for the wind turbine;
      determine a current wind turbine power output;
      determine a predicted wind turbine power output utilizing the predicted wind speed;
      compare the current wind turbine power output to the predicted wind turbine power output; and,
      adjust the wind turbine power output based on the comparison of the current wind turbine power output and the predicted wind turbine power output.

9. A system in accordance with claim 8, wherein the site controller is further configured to define a target power output range.

10. A system in accordance with claim 9, wherein the site controller configured to:
   compare the current wind turbine power output to the predicted wind turbine power output is further configured to determine if the predicted wind turbine power output is outside the defined target power output range; and
   calculate a desired power output if the predicted power output is outside the defined target power output range.

11. A system in accordance with claim 9, wherein the site controller is further configured to compare the current wind turbine power output to the predicted wind turbine power output is further configured to determine if the predicted rate-of-change of the wind turbine power output is outside the defined target power output range.

12. A system in accordance with claim 11, wherein the site controller configured to compare the current wind turbine power output to the predicted wind turbine power output is further configured to determine an operational adjustment in response to the calculated desired power output.

13. A system in accordance with claim 12, further comprising an energy storage device, wherein the site controller configured to adjust the wind turbine power output based on the comparison of the current wind turbine power output and the predicted wind turbine power output is further configured to utilize energy stored within the wind turbine energy storage device.

14. A system in accordance with claim 8, wherein the site controller configured to adjust the wind turbine power output based on the comparison of the current wind turbine power output and the predicted wind turbine power output is further configured to transmit energy to the energy storage device.

15. One or more computer readable storage media having computer-executable instructions embodied thereon, wherein when executed by at least one processor, the computer-executable instructions cause the processor to:
   determine a predicted wind speed for a wind turbine;
   determine a current wind turbine power output;

determine a predicted wind turbine power output utilizing the predicted wind speed;

compare the current wind turbine power output to the predicted wind turbine power output; and, adjust the wind turbine power output based on the comparison of the current wind turbine power output and the predicted wind turbine power output.

16. One or more computer readable storage media in accordance with claim 15, wherein the computer-executable instructions cause the processor to define a target power output range.

17. One or more computer readable storage media in accordance with claim 16, wherein the computer-executable instructions cause the processor to determine if the predicted wind turbine power output is outside the defined target power output range.

18. One or more computer readable storage media in accordance with claim 17, wherein the computer-executable instructions cause the processor to calculate a desired power output if the predicted power output is outside the defined target power output range.

19. One or more computer readable storage media in accordance with claim 18, wherein the computer-executable instructions cause the processor to determine an operational adjustment in response to the calculated desired power output.

20. One or more computer readable storage media in accordance with claim 15, wherein the computer-executable instructions cause the processor to utilize energy stored within a wind turbine energy storage device.

* * * * *